US010061113B2

(12) United States Patent
Klein

(10) Patent No.: US 10,061,113 B2
(45) Date of Patent: Aug. 28, 2018

(54) NIGHT VISION APPARATUS AND METHODS

(71) Applicant: Avner Klein, Victoria (AU)

(72) Inventor: Avner Klein, Victoria (AU)

(*) Notice: Subject to any disclaimer, the term of this patent is extended or adjusted under 35 U.S.C. 154(b) by 0 days.

(21) Appl. No.: 15/127,930

(22) PCT Filed: Mar. 23, 2015

(86) PCT No.: PCT/AU2015/050124
§ 371 (c)(1),
(2) Date: Sep. 21, 2016

(87) PCT Pub. No.: WO2015/139092
PCT Pub. Date: Sep. 24, 2015

(65) Prior Publication Data
US 2017/0219812 A1    Aug. 3, 2017

(30) Foreign Application Priority Data

Mar. 21, 2014  (AU) ................................ 2014900995
Nov. 27, 2014  (AU) ................................ 2014268232

(51) Int. Cl.
*G02B 23/12* (2006.01)
*F41G 1/32* (2006.01)
*H01J 29/98* (2006.01)
*H01J 31/50* (2006.01)
*F41G 1/35* (2006.01)
*F41G 1/36* (2006.01)

(52) U.S. Cl.
CPC .............. *G02B 23/12* (2013.01); *F41G 1/32* (2013.01); *F41G 1/35* (2013.01); *F41G 1/36* (2013.01); *H01J 29/98* (2013.01); *H01J 31/50* (2013.01)

(58) Field of Classification Search
CPC ... G02B 23/12; F41G 1/32; F41G 1/35; F41G 1/36; H01J 29/98; H01J 31/50
See application file for complete search history.

(56) References Cited

U.S. PATENT DOCUMENTS

| | | | |
|---|---|---|---|
| 4,853,529 A | 8/1989 | Meyers | |
| 6,288,386 B1 | 9/2001 | Bowen et al. | |
| 6,804,466 B1* | 10/2004 | Gazzetta | H04B 10/503 375/316 |
| 6,898,890 B2 | 5/2005 | Gaber | |
| 7,696,462 B2 | 4/2010 | Saldana | |
| 8,400,510 B2 | 3/2013 | O'Rourke | |
| 8,488,969 B1 | 4/2013 | Masarik | |
| 2004/0198336 A1 | 10/2004 | Jancic et al. | |
| 2012/0097741 A1* | 4/2012 | Karcher | F41G 1/38 235/404 |
| 2013/0320192 A1 | 12/2013 | Saldana | |

OTHER PUBLICATIONS

International Search Report and Written Opinion for Int. App. No. PCT/AU2015/050124, dated May 14, 2015.

* cited by examiner

*Primary Examiner* — Hugh H Maupin
(74) *Attorney, Agent, or Firm* — McDonnell Boehnen Hulbert & Berghoff LLP

(57) ABSTRACT

A portable night vision apparatus comprising at least one image intensifier tube and a memory. The at least one image intensifier tube is coupled to a power supply and coupled to a processor. The memory is coupled to the processor for the storage of data relating to the apparatus and to the use of the apparatus.

22 Claims, 3 Drawing Sheets

NIGHT VISION APPARATUS AND METHODS

CROSS REFERENCE TO RELATED APPLICATIONS

The present application is a U.S. National Phase Application pursuant to 35 U.S.C. § 371 of International Application No. PCT/AU2015/050124 filed Mar. 23, 2015, which claims priority to Australian Patent Application No. 2014900995 filed Mar. 21, 2014 and Australian Patent Application No. 2014268232 filed Nov. 27, 2014. The entire disclosure contents of these applications are herewith incorporated by reference into the present application.

FIELD OF THE INVENTION

The present invention relates to night vision apparatus or devices, such as night vision binoculars, monoculars, goggles and the like and to associated methods.

BACKGROUND TO THE INVENTION

Night vision apparatus or devices, such as night vision binoculars, goggles, monoculars and scopes, enable users to have improved vision in low light or no light conditions, for example, in military, surveillance, law enforcement, hunting and rescue applications. Night vision apparatus typically comprise an image intensifier tube and associated circuitry for capturing photons which are converted to electrons, amplified and converted back to photons to produce an enhanced image of the scene being viewed through the apparatus. Such devices are typically hand-held, head-mounted, helmet-mounted or mounted to equipment, such as a weapon.

Developments in the design of night vision apparatus over seven decades include improvements in light amplification, image resolution and contrast, signal to noise ratios and reliability, a reduction in power consumption, size and weight of the apparatus and the inclusion of features such as auto-gating to protect users against temporary blindness. Further improvements in the design of night vision apparatus continue to be sought.

One feature of night vision apparatus is that they have a limited useful lifetime due to degradation of the image intensifier tube through activation and use of the image intensifier tube. Degradation of the image intensifier tube can lead to a reduction in the amplification of light levels and a degradation in the image displayed to the user, such as the representation of distances inaccurately. Whilst certain levels of degradation can be tolerated depending on the application for which the night vision apparatus are being used, beyond certain levels of degradation, the night vision apparatus must not be used, for example in aviation and other critical applications.

Consequently, it is important that night vision apparatus are maintained and their performance monitored to ensure the apparatus are in working order and replaced when necessary. Such maintenance is typically performed by taking the apparatus apart and inspecting the components and recording and tracking relevant information on a spreadsheet or the like. In many countries certain restrictions apply to night vision apparatus and it is a requirement to also record certain data relating to the night vision apparatus, such as serial numbers and types of apparatus. These maintenance and recordal obligations can be very time consuming and laborious particularly where a fleet of night vision apparatus is maintained, such as in military and law enforcement organisations.

OBJECT OF THE INVENTION

It is a preferred object of the present invention to provide an apparatus and/or a system and/or a method that addresses or at least ameliorates one or more of the aforementioned problems and/or provides a useful commercial alternative.

SUMMARY OF THE INVENTION

Generally, embodiments of the present invention relate to night vision apparatus, such as night vision binoculars, goggles, monoculars and scopes comprising an on board memory for the storage of data relating to the apparatus and the use of the apparatus and to associated methods.

Generally, embodiments of the present invention also relate to night vision apparatus comprising a transmitter, such as an infra red (IR) transmitter, for transmitting the data relating to the apparatus and the use of the apparatus and to associated methods.

Generally, embodiments of the present invention also relate to night vision apparatus comprising a processor for calibrating the apparatus and to associated methods.

According to one aspect, but not necessarily the broadest aspect, the present invention resides in a portable night vision apparatus comprising:

at least one image intensifier tube coupled to a power supply and coupled to a processor; and a memory coupled to the processor to store data relating to the apparatus and to the use of the apparatus.

According to another aspect, but not necessarily the broadest aspect, the present invention resides in a method of monitoring and maintaining one or more portable night vision apparatus, the apparatus comprising at least one image intensifier tube coupled to a power supply and coupled to a processor and a memory coupled to the processor, the method comprising:

storing in the memory data relating to the apparatus and to the use of the apparatus; and transmitting at least some of the data stored in the memory to an external reader via a transmitter coupled to the processor.

Preferably, the transmitter is a low energy, short range transmitter, such as an infra red (IR) light emitting diode (LED).

Preferably, transmitting at least some of the data occurs when the apparatus is switched on and only for a short time period.

Suitably, the IR LED is also used for illumination purposes.

Preferably, the apparatus comprises a sensor coupled to the processor to detect ambient light levels.

Suitably, the sensor is a photoresistor or light-dependent resistor.

Suitably, the processor is configured to cut off the power supply to the at least one image intensifier tube via a switch if the ambient light levels are greater than a specified illumination threshold.

Suitably, the apparatus comprises a communications device to transmit and receive data relating to the apparatus and to the use of the apparatus to/from an external device.

Suitably, the apparatus comprises one or more accelerometers coupled to the processor to detect a predefined movement and switch off one or more of the at least one image intensifier tube.

Suitably, one of the accelerometers is associated with a movement of a circuit board comprising the power supply and/or the processor.

Suitably, one or more of the accelerometers are associated with a movement of the at least one image intensifier tubes.

Suitably, the data relating to the apparatus includes, but is not limited to one or more of the following: a serial number and/or date of manufacture of the apparatus; a serial number and/or date of manufacture of the at least one image intensifier tube; a serial number and/or date of manufacture of a circuit board comprising the components; a type of the apparatus, such as monocular or binocular; a class of the apparatus, such as a particular generation or Figure of Merit (FOM); capabilities of the apparatus; an image of a surface of the image intensifier tube at one or more specified dates; an image obtained through the image intensifier tube at one or more specified dates.

Suitably, the data relating to the apparatus includes images recording the state of the image intensifier tube at the beginning of its working life and at subsequent dates.

Suitably, the data relating to the use of the apparatus includes, but is not limited to one or more of the following: usage time of the apparatus; number of times the apparatus has been switched on and off; periods of high illumination or above a specified illumination threshold. Suitably, the data is used to monitor the apparatus for maintenance and or warranty purposes.

Suitably, the method includes calibrating the apparatus using the processor of the apparatus.

Further aspects and/or features of the present invention will become apparent from the following detailed description.

BRIEF DESCRIPTION OF THE DRAWINGS

In order that the invention may be readily understood and put into practical effect, reference will now be made to embodiments of the present invention with reference to the accompanying drawings, wherein like reference numbers refer to identical elements. The drawings are provided by way of example only, wherein.

Figure 1:
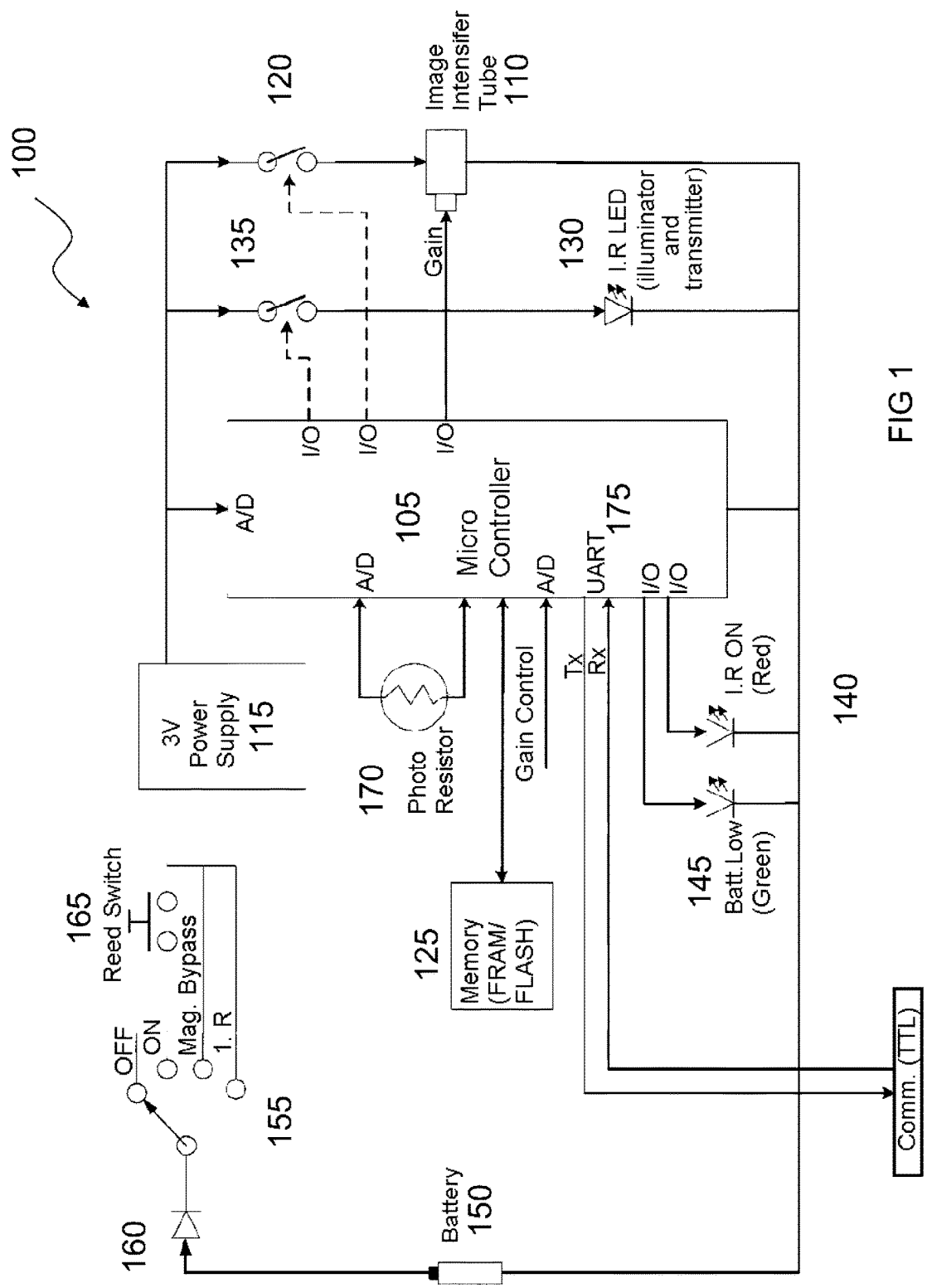
FIG. 1 is a block diagram of a night vision apparatus according to embodiments of the present invention.

Skilled addressees will appreciate that elements in the drawings are illustrated for simplicity and clarity and have not necessarily been drawn to scale. For example, the relative dimensions of some of the elements in the drawings may be distorted to help improve understanding of embodiments of the present invention.

DETAILED DESCRIPTION OF THE INVENTION

Embodiments of the present invention relate to portable night vision apparatus or devices, such as night vision binoculars, monoculars, goggles, scopes and the like and to associated methods as will be described in detail herein.

With reference to FIG. 1, a schematic block diagram illustrates a portable night vision apparatus 100, which comprises a processor 105 in the form of a micro controller coupled to at least one image intensifier tube 110. The processor 105 is coupled to the image intensifier tube 110 via an analogue/digital input of the processor 105 and via a digital/analogue output of the processor 105. A gain control input 112 for the image intensifier tube 110 is received via another analogue/digital input of the processor 105.

It will be appreciated that where the apparatus 100 is in the form of a night vision monocular or a night vision scope, for example for attachment to equipment such as a weapon, the apparatus 100 will typically comprise a single image intensifier tube 110. Where the apparatus 100 is in the form of night vision binoculars or night vision goggles, the apparatus will typically comprise a pair of image intensifier tubes 110 with appropriate adjustments to the apparatus 100 as will be appreciated by a person skilled in the art.

The image intensifier tube 110 is coupled to a power supply 115, such as a 3V power supply and can be coupled to the power supply via a switch 120, as shown in FIG. 1. Processor 105 can also be coupled to the switch 120 via an input/output of the processor 105 to control the power supply to the image intensifier tube 110.

The apparatus 100 also comprises a storage medium in the form of a memory 125 coupled to the processor 105 for the storage of data relating to the apparatus and data relating to the use of the apparatus. Memory 125 comprises a computer readable medium, such as a random access memory (e.g. static random access memory (SRAM), ferroelectric random access memory (FRAM), or synchronous dynamic random access memory (SDRAM)), or hybrid memory (e.g., FLASH), or other types of memory as are well known in the art.

In addition to the data relating to the apparatus and use of the apparatus described further herein, the computer readable medium can comprise computer readable program code components at least some of which are selectively executed to cause transmitting at least some of the data stored in the memory 125 to an external reader as described herein.

A transmitter 130 is coupled in parallel with the processor 105 via a switch 135 and to the power supply 115. Control of the switch 135 can be via another input/output of the processor 105. In preferred embodiments, transmitter 130 is a low energy, short range transmitter, such as an infra red (IR) light emitting diode (LED). Transmission of data from the apparatus 100 is described further herein. Where the transmitter is in the form of an IR LED, the IR LED can also be used for illumination purposes as is known in the art.

Processor 105 is also coupled to one or more other light emitting diodes (LEDs) 140, 145 for indication purposes. For example, LED 140 can be in the form of a red LED indicating when the transmitter 130 is on and LED 145 can be in the form of a green LED indicating that a battery 150 of the apparatus is low.

Battery 150 is coupled to a switch or selector 155 via a diode 160, which provides reverse polarity protection. Selector 155 is coupled via a reed switch 165 to power supply 115 and can be moved by a user between on and off positions. Selector 155 can also be moved to a magnetic bypass position and to a position to activate the transmitter 130. For example, the switch can be a four position rotary switch.

A sensor, such as a photoresistor or light-dependent resistor 170, is coupled to the processor 105 via at least one analogue/digital input for the detection of ambient light levels. Detection of ambient light levels enables the processor 105 to control the level of amplification required by the image intensifier tube 110 and to cut off the power supply to the image intensifier tube 110 via switch 120 in circumstances of high light levels, for example if the ambient light levels are greater than a specified illumination threshold, to avoid eyesight damage to the user and to preserve the useful life of the image intensifier tube 110. This function can be calibrated by the processor 105, via software and via password protection or encryption, by adjusting the illumination threshold and the time to power cut-off. In one example, the illumination threshold is 5000 Lux.

A communications device is provided to transmit and receive data, such as the data relating to the apparatus and to the use of the apparatus to/from an external device. Communication with processor 105 to external devices can be used, for example, for maintenance, programming, upgrades, calibration, etc. In the embodiment, shown in FIG. 1, the communications device is in the form of a universal asynchronous receiver/transmitter (UART) 175.

In one embodiment, the apparatus is calibrated via the UART 175 using an external device, for example, a computer. For example, software running on the external device can be used via the UART 175 to adjust values and/or settings of the apparatus, such as the illumination threshold.

Persons skilled in the art will appreciate that the portable night vision apparatus 100 can comprise other known elements required for the apparatus to perform its known functions, but which are not shown in FIG. 1 and which can vary according to the specific type of portable night vision apparatus.

In accordance with embodiments of the present invention, the data stored in the memory 125 relating to the apparatus 100 includes, but is not limited to one or more of the following: a serial number and/or date of manufacture of the apparatus 100; a serial number and/or date of manufacture of the at least one image intensifier tube 110; a serial number and/or date of manufacture of a circuit board comprising the components a type of apparatus, such as a monocular, binoculars, goggles or a scope; a class of the apparatus 100, such as a particular generation or Figure of Merit (FOM); capabilities of the apparatus; import/export restrictions; an image of a surface of the image intensifier tube 110 at one or more specified dates; an image obtained through the image intensifier tube 110 at one or more specified dates. In one example, images of the image intensifier tube are uploaded to the memory 125 via the UART 175, for example, during maintenance, upgrade or manufacture. In another example, a serial number and/or date of manufacture of the at least one image intensifier tube 110 is uploaded to the memory 125 via the UART 175, for example, when the image intensifier tube 110 is installed in the apparatus.

The images of the image intensifier tube 110 stored in the memory 125 of the apparatus record the state of the image intensifier tube 110 at the beginning of its working life and at subsequent dates such that the change in characteristics or degradation of the image intensifier tube 110 can be monitored and the apparatus 100, or the image intensifier tube 110, can be replaced when appropriate. Recording images of the image intensifier tube 110 is also useful for warranty purposes. Recording images of the image intensifier tube 110 can include recording any black spots detected, illumination levels, resolution etc.

For example, the images of the image intensifier tube at each date can be compared to determine whether the image intensifier tube has deteriorated due to misuse or mistreatment of the apparatus. For example, the data relating to the use of the apparatus can be used to determine whether, for example, the deterioration is due to long periods of exposure to high ambient light levels, which would suggest that the apparatus has been left in the sun.

The data stored in the memory 125 relating to the use of the apparatus 100 includes, but is not limited to one or more of the following: usage time or operational duration of the apparatus; a number of times the apparatus has been switched on and off (activated/deactivated); periods of high illumination or above a specified illumination threshold. These values influence the useful lifetime of the image intensifier tube 110.

In some embodiments, the images of the image intensifier tube 110 are stored in a FRAM and the other data is stored in FLASH.

According to another aspect, embodiments of the present invention include the transmitter 130 transmitting at least some of the data stored in the memory 125 to an external reader, which can be carried by the user. In preferred embodiments, transmitting at least some of the data occurs automatically when the apparatus 100 is switched on and transmission only occurs for a short time period. The transmission of the data is low energy, short range and is not continuous for security and power consumption purposes.

Figure 2:
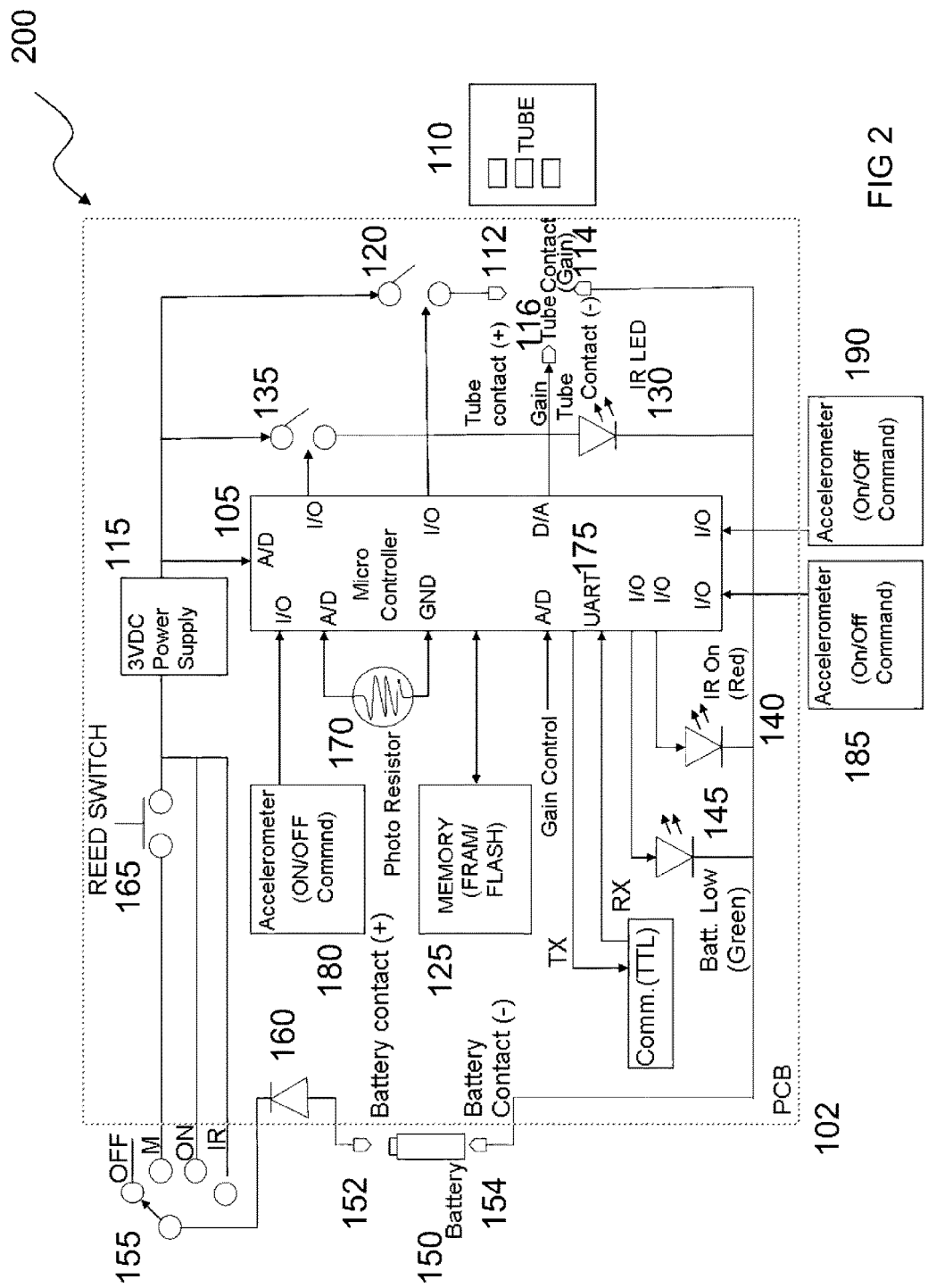
FIG. 2 is a block diagram of a night vision apparatus according to other embodiments of the present invention.

Referring to FIG. 2, a schematic block diagram illustrates a portable night vision apparatus 200 according to one embodiment of the invention. The night vision apparatus 200 comprises a circuit board 102, which comprises a number of on-board components shown within a dotted box. The circuit board 102 is connected to a number of off-board components of the apparatus shown outside the dotted box.

Tube contacts 112, 114 and 116 are provided on-board for connecting an image intensifier tube 110. The tube contacts can be, for example, flexible copper contacts. The tube contacts include a positive tube contact 112, a negative tube contact 114 and a tube gain contact 116. A person skilled in the art will appreciate that some image intensifier tubes 110 will not have a tube gain contact and therefore will only connect to the positive tube contact 112 and negative tube contact 114.

Where the apparatus 200 comprises more than one image intensifier tubes 110, such as binoculars, a separate set of contacts 112, 114, 116 and a switch 120 is provided for each image intensifier tube 110 to enable the image intensifier tubes to be controlled and calibrated separately.

Battery terminals 152 and 154 are provided off-board, for example, in a battery compartment, for connecting a battery 150. The battery 150 provides power to the power supply 115 which sets the voltage across the processor 105 and image intensifier tube 110.

The apparatus 200 also comprises one or more accelerometers coupled to the processor 105 to detect a predefined movement and switch off one or more of the at least one image intensifier tube 110. In preferred embodiments, each accelerometer can resolve acceleration in three dimensions. In some embodiments, data relating to the use of the apparatus received from the accelerometers is stored in the memory 125. The data can be used for warranty purposes, for example, to determine whether the apparatus 200 has been dropped.

A first accelerometer 180 is provided on-board and therefore is associated with a movement of the circuit board 102. In one embodiment, the first accelerometer 180 is configured to detect a translation in the y-axis, such as a lifting of the circuit board 102 and hence the apparatus 200, and turn off the image intensifier tube 110. For example, the first accelerometer 180 can detect a user removing the apparatus 200 in a head-mounted or helmet-mounted apparatus.

One or more of the accelerometers can be associated with a movement of the at least one image intensifier tubes 110. For example, when the apparatus is a binocular apparatus, a second accelerometer 185 is located on and/or associated with a first image intensifier tube 110 and a third accelerometer 190 is located on and/or associated with a second image intensifier tube 110. The accelerometers each detect a predefined movement of the respective image intensifier tube 110, for example, a turning or translation in the x-axis, and turn off the respective image intensifier tube 110. This enables each eye of the night vision binocular to be switched on/off separately. In a binocular apparatus, the circuit board 102 comprises two sets of image intensifier tube contacts to enable to the gain of each image intensifier tube 110 to be adjusted and/or each image intensifier tube 110 to be switched on/off separately. A skilled addressee will appreciate that in a monocular apparatus with only one image intensifier tube 110, the third accelerometer 190 is not required.

In the embodiment shown in FIG. 2, a switch or selector 155 is provided off-board, and is for example, mounted at an exterior of the apparatus 200.

Selector 155 is coupled to power supply 115 and can be moved by a user between on and off positions. Selector 155 can also be moved to a magnetic position where the selector 155 is coupled to power supply 115 via a reed switch 165 and to a position to activate the transmitter 130.

The reed switch is activated via a magnet. For example, a magnet is configured on the apparatus such that the reed switch is activated when the at least one image intensifier tubes 110 is moved into position over a user's eye(s) for use.

Figure 3:
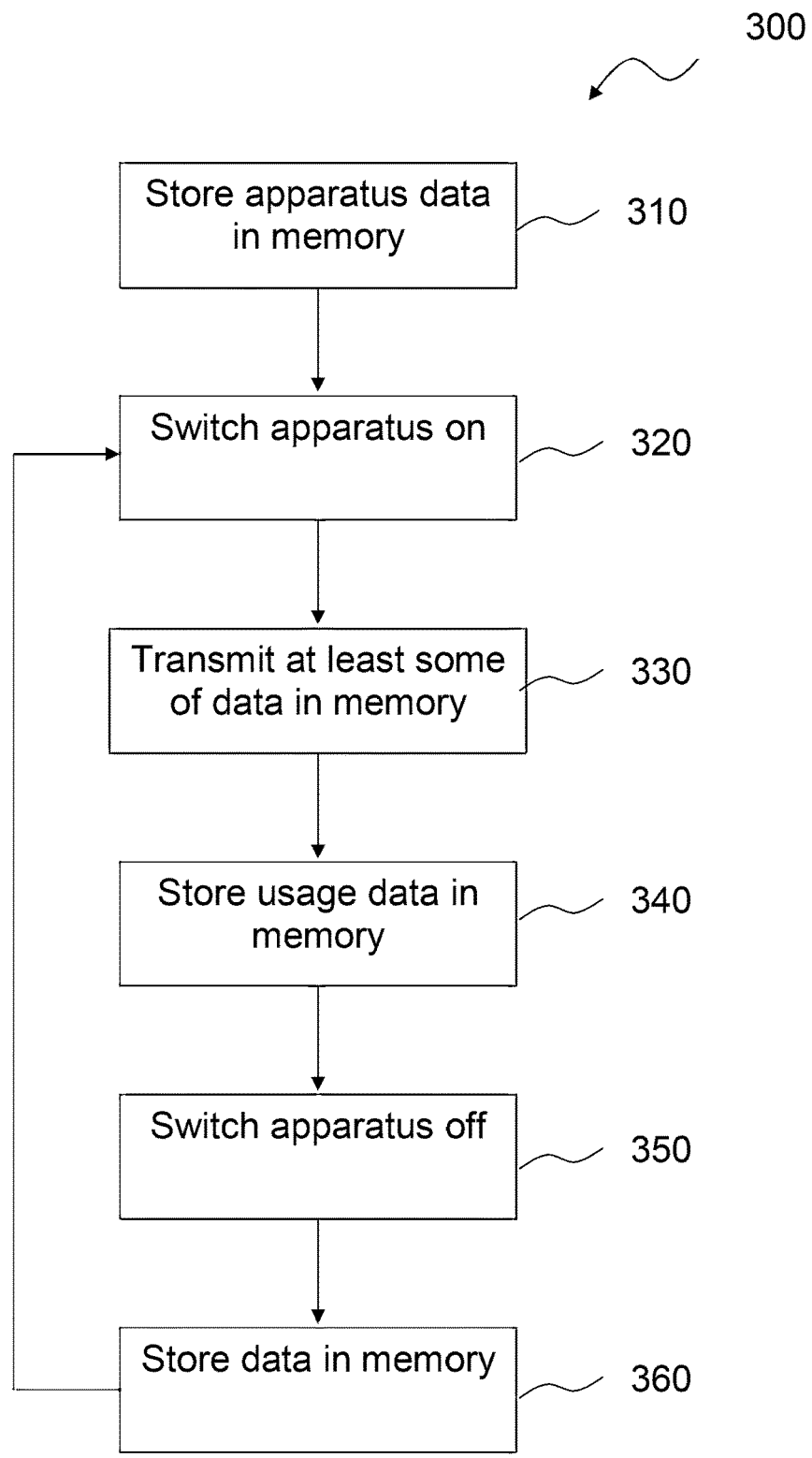
FIG. 3 is a general flow diagram illustrating methods according to embodiments of the present invention.

Referring to FIG. 3, a general flow diagram illustrates a method 300 of monitoring and maintaining one or more portable night vision apparatus 100 or 200 in accordance with embodiments of another aspect of the present invention. The method 300 comprises at step 310 storing in the memory 125 data relating to the apparatus 100 as described herein. For example, data may be received from one or more sensors of the apparatus or uploaded to the apparatus via the communications device 175. At step 320, the apparatus 100 is switched on (activated). Activation of the apparatus 100 causes at step 330 transmitting at least some of the data stored in the memory 125 to an external reader via the transmitter 130 as described herein. The method 300 comprises at 340 storing in the memory 125 data relating to the use of the apparatus 100 as described herein. At step 350, the apparatus 100 is switched off (deactivated), which is also recorded in the memory 125 at step 360. The cycle from steps 320 to 360 is repeated when the apparatus is re-activated.

According to further aspects of the present invention, calibration of the apparatus 100 and control of the gain of the apparatus 100 via gain control 112 is carried out using the processor 105. Inverse polarity protection is also provided by the circuit board rather than mechanically as in the prior art.

Embodiments of the present invention thus provide a solution the aforementioned problems and provide a useful commercial alternative. Storing in the on-board memory 125 of the portable night vision apparatus 100 data relating to the apparatus and to the use of the apparatus 100 as described herein is much more efficient and accurate than the prior art method of recording the data via a spreadsheet and is particularly useful when managing a fleet of night vision apparatus. Such recording and monitoring reduces the likelihood of any particular apparatus in a fleet being overused or underused, increases the likelihood that devices or components will be replaced when due and increases the likelihood that the best apparatus in a fleet are being sent out into the field.

Transmission of the data automatically upon activation of the apparatus 100 via transmitter 130, such as a low energy, short range IR LED, is secure, efficient and reliable. Also, a connector or cable is not required for such transmission, which reduces the component count and therefore the weight and production cost of the apparatus. Furthermore, the apparatus 100 does not need to be opened to obtain the information.

In this specification, the terms "comprises", "comprising" or similar terms are intended to mean a non-exclusive inclusion, such that an apparatus that comprises a list of elements does not include those elements solely, but may well include other elements not listed.

Throughout the specification the aim has been to describe the invention without limiting the invention to any one embodiment or specific collection of features. Persons skilled in the relevant art may realize variations from the specific embodiments that will nonetheless fall within the scope of the invention.

The invention claimed is:

1. A portable night vision apparatus comprising:
   at least one image intensifier tube coupled to a power supply and coupled to a processor;
   a memory coupled to the processor to store data relating to the apparatus and to the use of the apparatus; and
   a transmitter coupled to the processor to transmit at least some of the data stored in the memory to an external reader, wherein the transmitter is an illumination infra-red light emitting diode that is used for infra-red illumination for active night vision and is used as a low energy, short range transmitter.

2. The apparatus of claim 1, wherein the apparatus is configured to transmit the data when the apparatus is switched on and only for a short time period.

3. The apparatus of claim 1, comprising a sensor coupled to the processor to detect ambient light levels.

4. The apparatus of claim 3, wherein the sensor is a photoresistor or light-dependent resistor.

5. The apparatus of claim 3, wherein the processor is configured to cut off the power supply to the at least one image intensifier tube via a switch if the ambient light levels are greater than a specified illumination threshold.

6. The apparatus of claim 1, comprising a communications device to transmit and receive data relating to the apparatus and to the use of the apparatus to/from an external device.

7. The apparatus of claim 1, comprising one or more accelerometers coupled to the processor to detect a predefined movement and switch off one or more of the at least one image intensifier tube.

8. The apparatus of claim 7, wherein one of the accelerometers is associated with a movement of a circuit board comprising the power supply and/or the processor.

9. The apparatus of claim 7, wherein one or more of the accelerometers are associated with a movement of the at least one image intensifier tubes.

10. The apparatus of claim 1, wherein the data relating to the apparatus includes one or more of the following:
    a serial number and/or date of manufacture of the apparatus;
    a serial number and/or date of manufacture of the at least one image intensifier tube;
    a serial number and/or date of manufacture of a circuit board comprising components of the apparatus;
    a type of the apparatus;
    a class of the apparatus;
    a particular generation or Figure of Merit (FOM) of the apparatus; and
    capabilities of the apparatus.

11. The apparatus of claim 1, wherein the data relating to the apparatus includes one or more of the following:
   an image of a surface of the image intensifier tube at one or more specified dates; and
   an image obtained through the image intensifier tube at one or more specified dates.

12. The apparatus of claim 1, wherein the data relating to the apparatus includes images recording the state of the image intensifier tube at the beginning of its working life and at subsequent dates.

13. The apparatus of claim 1, wherein the data relating to the use of the apparatus includes one or more of the following:
   usage time of the apparatus;
   a number of times the apparatus has been switched on and off; and
   periods of high illumination or above a specified illumination threshold.

14. The apparatus of claim 1, wherein the data is used to monitor the apparatus for maintenance and or warranty purposes.

15. A method of monitoring and maintaining one or more portable night vision apparatus, the apparatus comprising at least one image intensifier tube coupled to a power supply and coupled to a processor and a memory coupled to the processor, the method comprising:
   storing in the memory data relating to the apparatus and to the use of the apparatus; and
   transmitting at least some of the data stored in the memory to an external reader via a transmitter coupled to the processor, wherein the transmitter is an illumination infra-red light emitting diode that is used for infra-red illumination for active night vision and is used as a low energy, short range transmitter.

16. The method of claim 15, including transmitting at least some of the data when the apparatus is switched on and only for a short time period.

17. The method of claim 15, including calibrating the apparatus using the processor of the apparatus.

18. The method of claim 15, wherein the data relating to the apparatus includes one or more of the following:
   a serial number and/or date of manufacture of the apparatus;
   a serial number and/or date of manufacture of the at least one image intensifier tube;
   a serial number and/or date of manufacture of a circuit board comprising components of the apparatus;
   a type of the apparatus;
   a class of the apparatus;
   a particular generation or Figure of Merit (FOM) of the apparatus; and
   capabilities of the apparatus.

19. The method of claim 15, wherein the data relating to the apparatus includes one or more of the following:
   an image of a surface of the image intensifier tube at one or more specified dates; and
   an image obtained through the image intensifier tube at one or more specified dates.

20. The method of claim 15, wherein the data relating to the apparatus includes images recording the state of the image intensifier tube at the beginning of its working life and at subsequent dates.

21. The method of claim 15, wherein the data relating to the use of the apparatus includes one or more of the following:
   usage time of the apparatus;
   a number of times the apparatus has been switched on and off;
   periods of high illumination or above a specified illumination threshold.

22. The method of claim 15, wherein the data is used to monitor the apparatus for maintenance and or warranty purposes.

* * * * *